United States Patent
Rixon et al.

(10) Patent No.: US 7,195,091 B2
(45) Date of Patent: Mar. 27, 2007

(54) CRASH RELIEF PEDAL ASSEMBLY

(75) Inventors: Christopher Rixon, Warren, MI (US);
Sundar Ananthasivan, Farmington Hills, MI (US)

(73) Assignee: Drivesol Worldwide, Inc., Troy, MI (US)

( * ) Notice: Subject to any disclaimer, the term of this patent is extended or adjusted under 35 U.S.C. 154(b) by 588 days.

(21) Appl. No.: 10/635,138

(22) Filed: Aug. 6, 2003

(65) Prior Publication Data

US 2005/0028636 A1 Feb. 10, 2005

(51) Int. Cl.
*B60K 28/01* (2006.01)

(52) U.S. Cl. .......................... 180/274; 74/512; 74/526; 280/748; 188/371

(58) Field of Classification Search .............. 180/271, 180/274, 275, 277, 282; 280/748, 751, 752; 188/371; 74/512, 526

See application file for complete search history.

(56) References Cited

U.S. PATENT DOCUMENTS

| | | |
|---|---|---|
| 3,664,130 A | 5/1972 | Meyers |
| 4,172,603 A | 10/1979 | St. Clair et al. |
| 5,468,058 A | 11/1995 | Linkner, Jr. |
| 5,531,135 A | 7/1996 | Dolla ........................ 74/512 |
| 5,575,181 A | 11/1996 | Baumann ................... 74/512 |
| 5,615,749 A | 4/1997 | Kato ........................ 180/274 |
| 5,632,184 A | 5/1997 | Callicutt et al. ............ 74/512 |
| 5,647,647 A | 7/1997 | Kato et al. |
| 5,685,200 A | 11/1997 | Baumann ................... 74/512 |
| 5,737,919 A | 4/1998 | Gautier et al. |
| 5,778,732 A | 7/1998 | Patzelt et al. ............... 74/512 |
| 5,848,558 A | 12/1998 | Isono et al. ................. 74/512 |
| 5,848,662 A | 12/1998 | Sakaue ..................... 180/274 |
| 5,896,781 A | 4/1999 | Müller ....................... 74/512 |
| 5,916,330 A | 6/1999 | Jacobson ................... 74/512 |
| 5,921,144 A | 7/1999 | Williams, Jr. et al. ....... 74/512 |
| 5,927,821 A * | 7/1999 | Bauer et al. ................... 303/1 |
| 5,983,746 A | 11/1999 | Nawata et al. ............... 74/512 |
| 5,996,439 A | 12/1999 | Elton et al. ................. 74/512 |
| 5,996,440 A | 12/1999 | Nawata et al. ............... 74/512 |
| 6,006,626 A | 12/1999 | Notake et al. ............... 74/512 |
| 6,024,420 A | 2/2000 | Yonemura et al. ....... 303/113.2 |
| 6,026,706 A | 2/2000 | Güther et al. ............... 74/512 |
| 6,041,674 A | 3/2000 | Kato ........................ 74/512 |
| 6,055,883 A | 5/2000 | Kato ........................ 74/512 |
| 6,070,488 A | 6/2000 | Yabusaki et al. ............ 74/512 |
| 6,076,422 A | 6/2000 | Tabata ....................... 74/512 |

(Continued)

*Primary Examiner*—Paul N. Dickson
*Assistant Examiner*—Timothy Wilhelm
(74) *Attorney, Agent, or Firm*—Howard & Howard Attorneys, P.C.

(57) ABSTRACT

A fluid relief device (40) is responsive to a sensor (38) for relieving the hydraulic fluid pressure in hydraulic line (30) in response to the crash conditions. A fuseable link (52) abuts the distal end of a shaft (46) and holds the piston (42) in the normal operating position until a crash where the fuseable link (52) is consumed or removed to allow movement of the shaft (46) and the piston (42) to the accumulator position to relieve pressure in the hydraulic system. A resilient curved leaf spring member (60) reacts between the cross beam (16) and the pedal arm (20) in the event of rearward movement of the pedal arm (20) out of the normal operating range due to a crash to limit movement of the pedal arm (20) toward the operator space. The resilient spring (60) and the fluid relief device (40) are reusable.

12 Claims, 4 Drawing Sheets

U.S. PATENT DOCUMENTS

| | | |
|---|---|---|
| 6,082,219 A | 7/2000 | Wolpert ........................ 74/512 |
| 6,089,119 A | 7/2000 | Leboisne et al. .............. 74/512 |
| 6,089,342 A | 7/2000 | Müller et al. ................ 180/274 |
| 6,101,894 A | 8/2000 | Tiemann et al. .............. 74/512 |
| 6,112,615 A | 9/2000 | Nawata et al. ................ 74/512 |
| 6,112,616 A | 9/2000 | Schonlau et al. .............. 74/512 |
| 6,142,036 A | 11/2000 | Mizuma et al. ............... 74/512 |
| 6,155,385 A | 12/2000 | Basnett ....................... 188/72.7 |
| 6,176,340 B1 | 1/2001 | Mizuma et al. ............. 180/274 |
| 6,178,846 B1 | 1/2001 | Specht et al. ................. 74/512 |
| 6,182,525 B1 | 2/2001 | Bowers et al. ................ 74/512 |
| 6,182,526 B1 | 2/2001 | Brooks ........................ 74/512 |
| 6,209,416 B1 | 4/2001 | Tiemann et al. .............. 74/512 |
| 6,253,635 B1 * | 7/2001 | Huber ........................ 74/512 |
| 6,269,900 B1 | 8/2001 | Adams et al. .............. 180/274 |
| 6,276,228 B1 | 8/2001 | Hoerster ....................... 74/512 |
| 6,279,417 B1 | 8/2001 | Mizuma et al. ............... 74/512 |
| 6,286,388 B1 | 9/2001 | Brewer ........................ 74/512 |
| 6,298,747 B1 | 10/2001 | Sutherland et al. ........... 74/512 |
| 6,327,930 B1 * | 12/2001 | Ono et al. .................... 74/512 |
| 6,336,376 B1 | 1/2002 | Lee ............................ 74/512 |
| 6,339,971 B1 | 1/2002 | Kato .......................... 74/512 |
| 6,354,171 B1 | 3/2002 | Wolpert et al. ............... 74/512 |
| 6,364,046 B1 | 4/2002 | Forssell et al. ............. 180/275 |
| 6,371,511 B1 | 4/2002 | Kitagawa .................. 280/730.1 |
| 6,565,160 B1 * | 5/2003 | Ewing et al. .................. 303/1 |
| 6,701,800 B2 * | 3/2004 | Saitou et al. ................. 74/512 |
| 6,808,040 B2 | 10/2004 | Hayashihara et al. ....... 180/315 |
| 6,866,294 B2 * | 3/2005 | Horsch et al. ............. 280/752 |

* cited by examiner

CRASH RELIEF PEDAL ASSEMBLY

BACKGROUND OF THE INVENTION

1. Field of the Invention

The subject invention relates to a pedal assembly for an automotive vehicle to prevent injury to the vehicle operator in the event of a crash as a result of the brake pedal moving into the operator space in response to crash forces.

2. Description of the Prior Art

Pedal displacement control structures are known in the prior art to counter the forces resulting from a vehicle crash. One such counter measure is illustrated in U.S. Pat. No. 6,327,930 to Ono et al. wherein a structural member is disposed between the cross beam and the pedal arm for deforming in response to crash forces to provide a counter force against the pedal arm in a crash condition. The limit of the movement of the pedal arm into the operator space is controlled solely by the deformation characteristics of the structural member and the hydraulic fluid trapped in the system can, in effect, act in concert with the crash forces. In addition, the deformed structural member must be replaced no matter the degree of deformation from crash forces.

There are also systems known to relieve the hydraulic pressure in the brake system in the event of a crash. Such a system is described in U.S. Pat. No. 6,565,160 to Ewing et al. however, the prior art systems use complex solenoids or mechanical systems that are seldom or never used.

There remains a need for a simple and inexpensive system yet one which can be reused without reconstruction.

SUMMARY OF THE INVENTION AND ADVANTAGES

The subject invention improves the crash capabilities in a vehicle wherein a support bracket 18 is supported by a vehicle under the instrument panel and pivotally supports a pedal arm forward of the operator space for operational movement in an operating range between a forward brake applying position for supplying hydraulic fluid pressure to a hydraulic system for actuating the vehicle brake system and a rearward release position by combining a crash control device having resilient characteristics for interacting between the cross beam of the vehicle and the pedal arm in the event of rearward movement of the pedal arm out of the operating range to limit movement of the pedal arm toward the operator space and a fluid release mechanism for relieving hydraulic fluid in the hydraulic system in response to crash conditions to allow the pedal arm to move forwardly unimpeded by hydraulic fluid.

Accordingly, the subject invention provides a re-useable crash control system for a brake pedal arm wherein the member between the cross beam and the pedal arm is resilient to spring back after a crash for continued use and a re-useable hydraulic pressure relief that accumulates hydraulic fluid and is re-useable.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
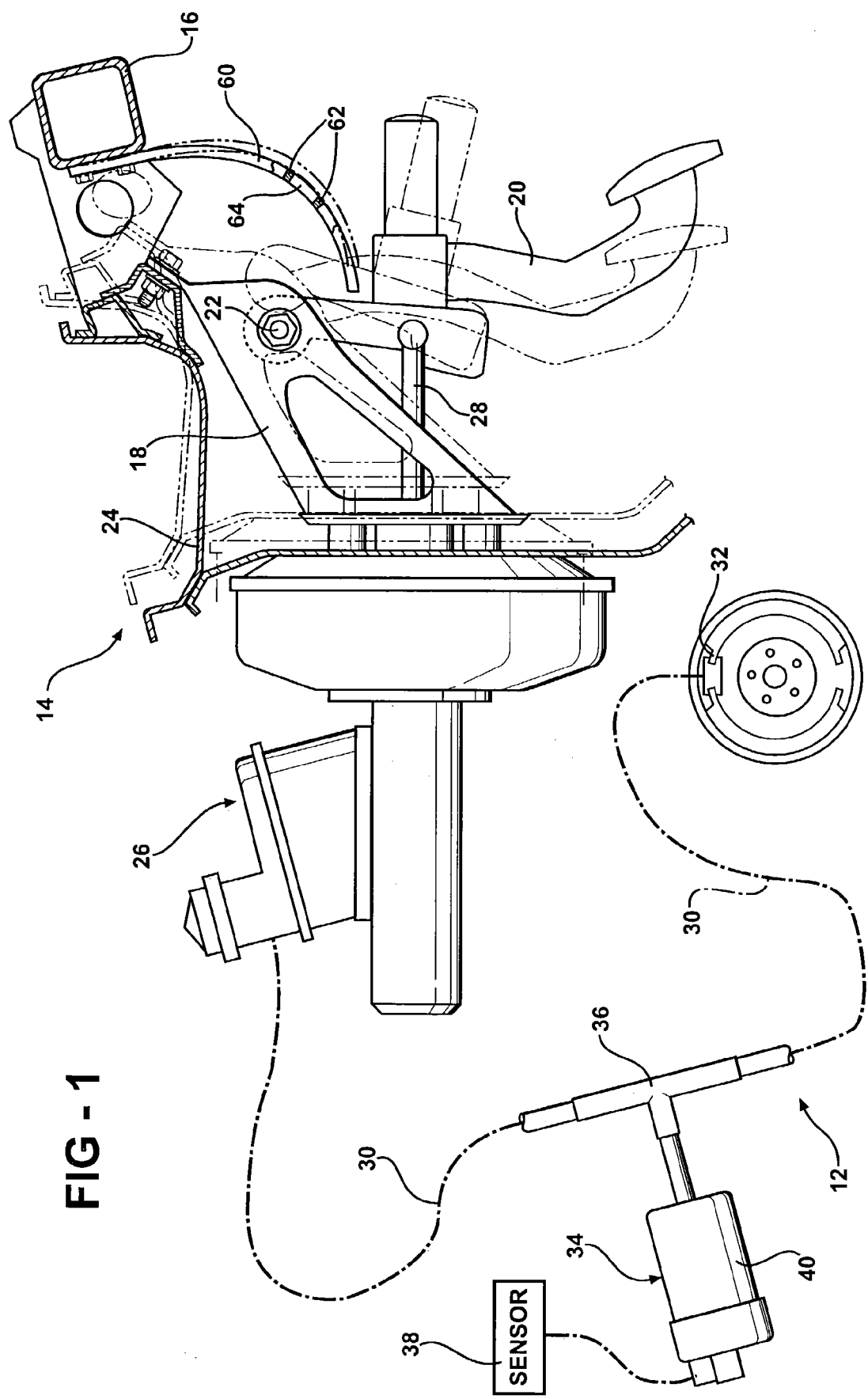
FIG. 1 is schematic view of the subject invention showing the crash position in phantom.

Referring to the Figures, wherein like numerals indicate like or corresponding parts throughout the several views, components of a vehicle include a brake system shown generally at 12 and a brake pedal support assembly shown generally at 14 and facing an operator space to the rear (right as viewed).

As is well known, the vehicle includes a vehicle cross beam 16 and a support bracket 18 attached to the front dash and front dash roof 24 and pivotally supporting a pedal arm 20 forward of the operator space for operational movement in an operating range between a forward brake applying position and a rearward release position. The pedal arm 20 is pivotally connected to the support bracket 18 by a bolt 22. The support bracket 18 is mounted on the front dash and front dash roof 24 that supports the traditional master cylinder and vacuum boost assembly generally shown at 26. The brake applying forces are transmitted to the master cylinder and vacuum boost assembly 26 by the pedal arm 20 through a rod 28. A hydraulic system includes the fluid line 30 and is responsive to the pedal arm 20 for pressurizing hydraulic fluid to actuate the vehicle brake system 32, i.e., for transmitting hydraulic pressure from the master cylinder and vacuum boost assembly 26 to the vehicle brake system 32.

A fluid release mechanism is generally indicated at 34 for relieving hydraulic fluid in the hydraulic system in response to crash conditions to allow the pedal arm 20 to move forwardly only once unimpeded by hydraulic fluid. The fluid release mechanism 34 is in fluid communication with the hydraulic system via a T connection in the line 30 or as part of body of an existing hydraulic braking component. The fluid release mechanism 34 includes a crash sensor 38 and a fluid relief device 40 responsive to the sensor 38 for relieving the hydraulic fluid pressure in hydraulic line 30 in response to the crash conditions. The sensor 38 could be the same sensor commonly used to deploy the air bags in the vehicle, or another similar activation device.

Figure 2:
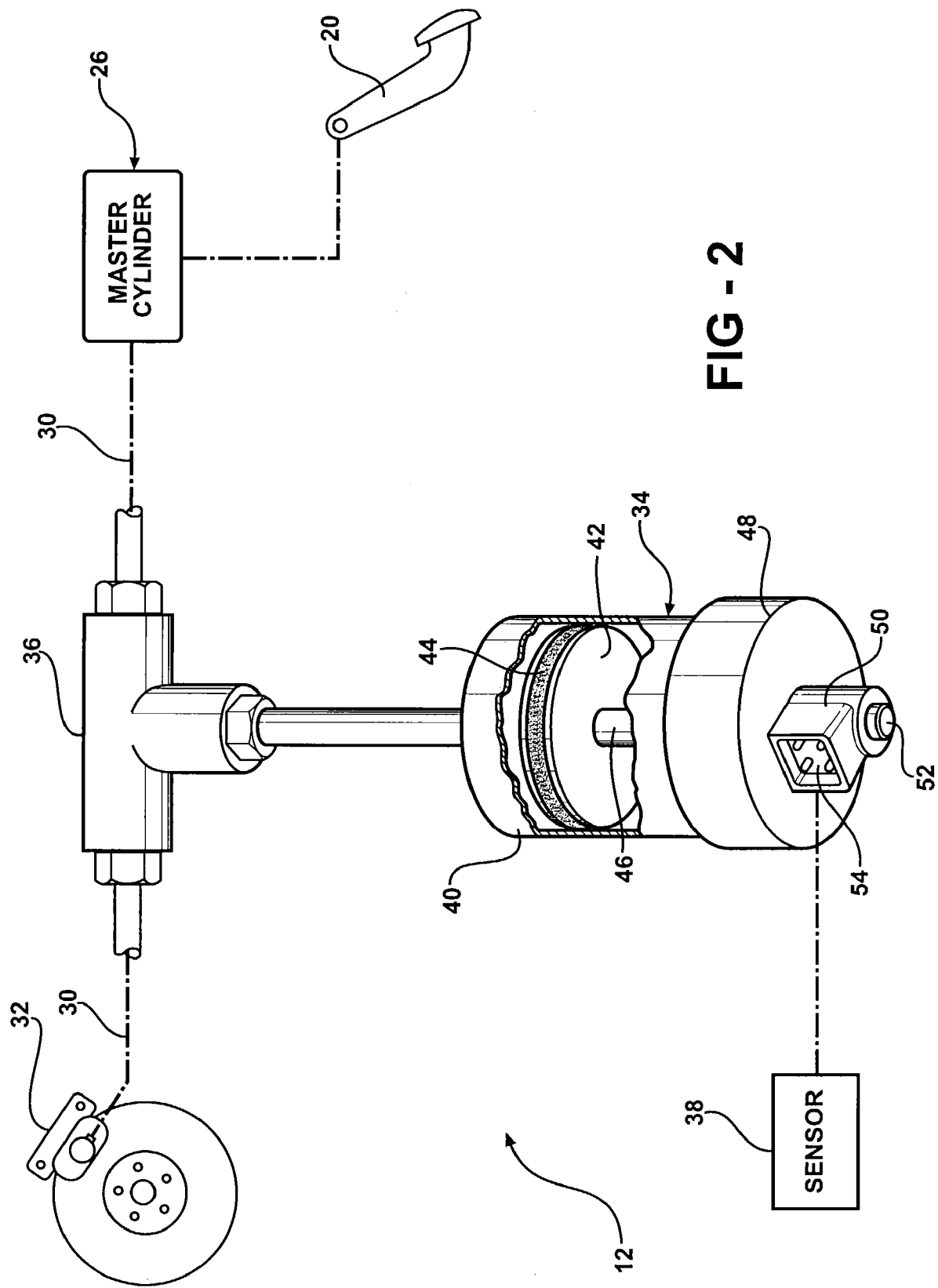
FIG. 2 is a schematic view of the brake hydraulic system of the subject invention.
Figure 3:
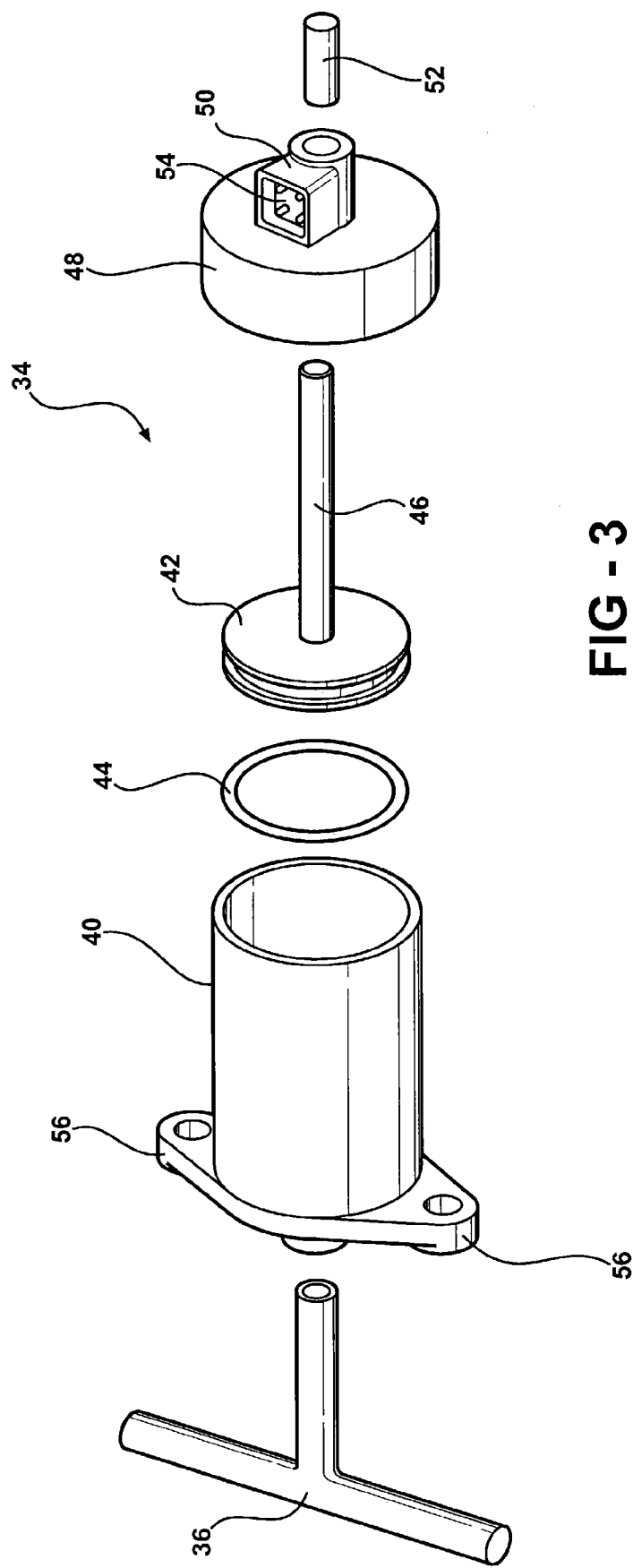
FIG. 3 is an exploded view of the fluid release mechanism of the subject invention.
Figure 4:
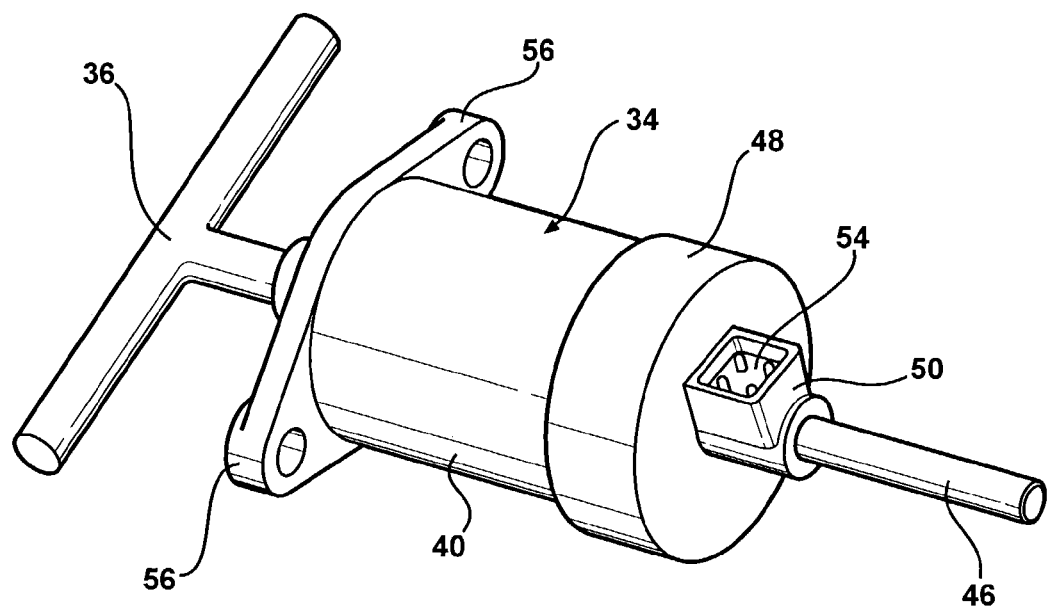
FIG. 4 is a perspective view of the fluid release mechanism in the accumulator position.
Figure 5:
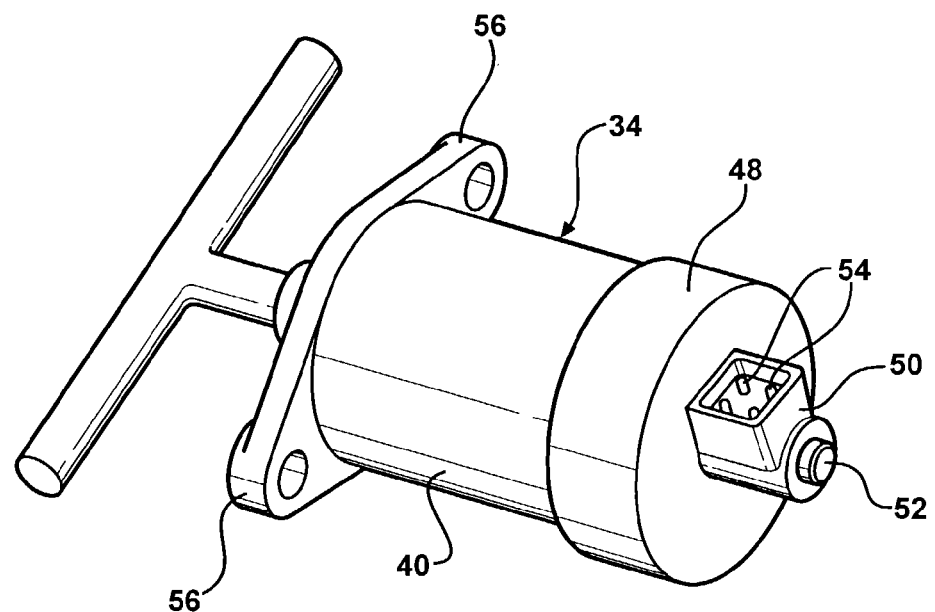
FIG. 5 is a perspective view of the fluid release mechanism in the normal operating position.

The fluid relief device 40 comprises a cylinder and a piston 42 slideably disposed in the cylinder for movement between a normal operating position retaining a minimal amount of hydraulic fluid from the hydraulic system and an accumulator position for accumulating hydraulic fluid from the hydraulic system. An O-ring 44 seals the piston 42 to the interior of the cylinder. A shaft 46 extends from the piston 42 to a distal end supported by a bore in the end of the cylinder. The cylinder includes an end cap 48 that defines the bore and a link compartment 50 for holding a fuseable link or fuse 52. The fuseable link 52 abuts the distal end of the shaft 46 and acts as a removable stop to hold the piston 42 in the normal operating position shown in FIGS. 2 and 5. The fuseable link 52 is removable to allow movement of the shaft 46 and the piston 42 to the accumulator position. The sensor 38 produces an electrical signal and the fuseable link 52 is responsive to the electrical signal from the sensor 38 for disintegration to allow free movement of the shaft 46 through the bore and out of the cap, as shown in FIG. 4. The link compartment 50 includes an electrical connector socket 54 for receiving an electrical lead for transmitting the electrical signal to ignite and consume the link 52. After the crash, the system may be re-set by placing another replacement fuseable link 52 in the link compartment 50 for resetting the hydraulic system. During the crash sequence, the link 52 disintegrates to allow movement of the piston 42 to the accumulator position farther into the cylinder 40 to receive hydraulic fluid from the fluid line 30 and when the system is reset, the piston is moved back to the normal operating position to force the accumulated hydraulic fluid back into the hydraulic system, thereby preventing rupturing of the system and weathering a crash without loss of hydraulic fluid. The cylinder 40 includes ears 56 for mounting the fluid relief device 40 to the vehicle.

A crash control device comprising a curved leaf spring member 60 having resilient characteristics for interacting between the cross beam 16 and the pedal arm 20 in the event of rearward movement of the pedal arm 20 out of the normal operating range to limit movement of the pedal arm 20 toward the operator space. The spring member 60 comprises a plastic member consisting of an organic polymeric material and includes a honeycombed structure with cross beams 62 and longitudinal beams 64. The spring member 60 is open between the honeycombed beams 62 and 64. The spring member 60 is designed resiliently to limit the force on the cross car beam and so protects it from overstressing or deformation.

During a crash, the spring member 60 moves to the phantom position as it resists rearward movement of the pedal arm 20. At the same time the air bag sensor 38 sends an electrical signal to remove the link 52 as a stop to movement of the shaft 46 to allow the piston 42 to move to the accumulator position further into the cylinder 40 to accumulate fluid from the hydraulic line 30. The release of fluid pressure in the line 30 removes resistance to movement of the pedal arm 20 in the rearward direction thereby allowing the spring member 60 to hold the pedal arm 20 out of the operator compartment without deformation. Accordingly, the spring 22 does not have to be replaced after a crash and the another fuseable link 52 may be inserted in the link compartment 50 to reset the system.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A vehicle comprising;
   an operator space,
   a cross beam (16),
   a pedal arm (20),
   a support bracket (18) supported by the vehicle (24) and pivotally supporting said pedal arm (20) forward of said operator space for operational movement in an operating range between a forward brake applying position and a rearward release position, and
   a crash control device (60) including a spring member having resilient characteristics mounted to said cross beam (16) and disposed between said cross beam (16) and said pedal arm (20) for interacting between said cross beam (16) and said pedal arm (20) in the event of rearward movement of said pedal arm (20) out of said range to limit movement of said pedal arm (20) toward said operator space.

2. A vehicle as set forth in claim 1 wherein said spring member includes a curved portion disposed between said cross beam (16) and said pedal arm (20).

3. A vehicle as set forth in claim 1 wherein said spring member comprises a plastic member consisting of an organic polymeric material.

4. A vehicle as set forth in claim 3 wherein said plastic member includes a honeycombed (62, 64) structure.

5. A crash relief system for a vehicle having an operator space and a cross beam (16), said system comprising;
   a pedal arm (20),
   a support bracket pivotally supporting said pedal arm (20) for operational movement in an operating range between a forward brake applying position and a rearward release position, and
   a crash control device (60) including a spring member having resilient characteristics for mounting to the cross beam (16) forward of said pedal arm (20) to interact between the cross beam (16) and said pedal arm (20),
   said spring member being spaced from said pedal arm (20) as said pedal arm (20) moves in said operating range between said forward and rearward positions and said spring member engaging said pedal arm (20) in the event of rearward movement of said pedal arm (20) out of said operating range to limit movement of said pedal arm (20) toward the operator space.

6. A system as set forth in claim 5 wherein said spring member includes a curved portion.

7. A system as set forth in claim 5 wherein said spring member is further defined as a curved leaf spring.

8. A system as set forth in claim 5 wherein said spring member comprises a plastic member consisting of an organic polymeric material.

9. A system as set forth in claim 8 wherein said plastic member includes a honeycombed (62, 64) structure.

10. A vehicle comprising;
    an operator space,
    a cross beam (16),
    a pedal arm (20),
    a support bracket (18) supported by the vehicle (24) and pivotally supporting said pedal arm (20) forward of said operator space for operational movement in an operating range between a forward brake applying position and a rearward release position, and
    a crash control device (60) including a curved leaf spring disposed between said cross beam (16) and said pedal arm (20) for interacting between said cross beam (16) and said pedal arm (20) in the event of rearward movement of said pedal arm (20) out of said range to limit movement of said pedal arm (20) toward said operator space.

11. A vehicle as set forth in claim 10 wherein said curved leaf spring comprises a plastic member consisting of an organic polymeric material.

12. A vehicle as set forth in claim 11 wherein said plastic member includes a honeycombed (62, 64) structure.

* * * * *